US006838509B2

(12) United States Patent
Shimo et al.

(10) Patent No.: US 6,838,509 B2
(45) Date of Patent: Jan. 4, 2005

(54) PHENOLIC RESIN COMPOSITE MATERIAL

(75) Inventors: Toshihisa Shimo, Kariya (JP); Atsushi Kidokoro, Kariya (JP); Yoshifumi Kato, Kariya (JP); Makoto Kato, Aichi (JP); Azusa Tsukigase, Aichi (JP); Kenzo Fukumori, Aichi (JP); Arimitsu Usuki, Aichi (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 243 days.

(21) Appl. No.: 10/053,212

(22) Filed: Jan. 15, 2002

(65) Prior Publication Data

US 2002/0177647 A1 Nov. 28, 2002

(30) Foreign Application Priority Data

Jan. 19, 2001 (JP) ........................................ 2001-011833

(51) Int. Cl.$^7$ ................................................ C08K 3/34
(52) U.S. Cl. ...................... 524/447; 524/425; 524/445; 524/449; 524/493; 524/494
(58) Field of Search ................. 524/447, 445, 524/449, 425, 494, 493

(56) References Cited

U.S. PATENT DOCUMENTS

| 3,830,894 | A | * | 8/1974 | Juenger ..................... 264/41 |
| 4,739,007 | A |   | 4/1988 | Okada et al. ............... 524/789 |
| 4,889,885 | A |   | 12/1989 | Usuki et al. ................. 524/445 |
| 5,309,690 | A | * | 5/1994 | Symons ..................... 52/309.9 |
| 6,391,595 | B1 | * | 5/2002 | Kato et al. .................. 435/100 |
| 6,610,770 | B1 | * | 8/2003 | Ross et al. .................. 524/445 |
| 2003/0100657 | A1 | * | 5/2003 | Twardowska et al. ...... 524/445 |
| 2003/0105208 | A1 | * | 6/2003 | Twardowska et al. ...... 524/445 |

FOREIGN PATENT DOCUMENTS

| DE | 31 48 326 A1 | 6/1983 | ............ C08K/7/04 |
| DE | 36 21 686 A1 | 1/1988 | ............ C09K/3/14 |
| DE | 38 06 548 C2 | 10/1996 | ............ C08J/5/24 |
| EP | 0 343 433 | 11/1989 | ............ C08L/61/06 |
| JP | 63-221168 | 9/1988 | ......... C08L/101/00 |
| JP | 03215558 | 9/1991 | ........... C08L/77/00 |
| JP | 10-330534 | 12/1998 | ............ C08K/3/34 |
| JP | 2000-169634 | 6/2000 | ............ C08L/21/00 |
| JP | 2000256492 | 9/2000 | ............. C08J/9/00 |

OTHER PUBLICATIONS

Choi, et al., XP–002236119, Chemistry of Materials, 12(10):2977–2983 (2000).

* cited by examiner

*Primary Examiner*—Edward J. Cain
(74) *Attorney, Agent, or Firm*—Morgan & Finnegan, LLP

(57) ABSTRACT

A phenolic resin composite material includes a phenolic resin, a filler dispersed in the phenolic resin and being a reinforcement member and an organized layered clay mineral being different from the filler and dispersed uniformly in the phenolic resin. The phenolic resin composite material is improved in terms of the heat resistance as well as the mechanical strengths.

8 Claims, 2 Drawing Sheets

PHENOLIC RESIN COMPOSITE MATERIAL

BACKGROUND OF THE INVENTION

1. Field of the Invention

The present invention relates to a phenolic resin composite material, which is good in terms of heat resistance, etc., and which is applicable to automotive component parts, aircraft component parts, component parts for electric and electronic instruments, materials for architecture, and so on.

2. Description of the Related Art

Phenolic resins have been used widely in resinous molded products, but most of them have been used as composite materials. Specifically, in order to improve the mechanical strengths of the resinous molded products, organic fillers, such as cotton, wooden powders, etc., inorganic fibers, such as glass fibers, carbon fibers, etc., and further inorganic fillers, such as clays, calcium carbonate, etc., have been mixed in phenolic resins.

However, even when inorganic materials, and the like, are simply added and mixed in phenolic resins, the inorganic materials bond very weakly with the phenolic resins which make a mother phase. Accordingly, when fillers are added to phenolic resins, it might be probable to cause a problem in that the resulting composite materials are embrittled, or the like.

Therefore, in order to strengthen the bonding between phenolic resins and inorganic materials, it has been know to treat inorganic materials with silane coupling agents, for example. Even in such a case, however, the bonding between them is exerted by the van der Waals force, and is improved to such an extent only that the affinity arises between them. Thus, in conventional phenolic resin composite materials, it has not been possible to sufficiently improve the reinforcement effect and heat resistance by the addition of inorganic materials.

In Japanese Patent Publication No. 3,014,674, there is a disclosure on a composite material in which a layered clay mineral is dispersed in a phenolic resin. Specifically, in the examples, a composite material is disclosed in which a layered clay mineral (e.g., montmorillonite), being turned into an onium salt, is mixed in a phenolic resin. In the case of the composite material, since the phenolic resin and the layered clay mineral are bonded by ion bond, by hydrogen bond or by both of them, the composite material is said to exhibit better mechanical strengths and heat resistance.

However, even such a phenolic composite material has been still insufficient in terms of the mechanical strengths, especially, in terms of the high temperature strength. Consequently, there have been demands for phenolic composite materials which can exhibit much better heat resistance.

SUMMARY OF THE INVENTION

The present invention has been developed in view the circumstances. It is therefore an object of the present invention to provide a novel phenolic resin composite material which can exhibit much better mechanical strengths, especially much better heat resistance, than those of conventional phenolic resin composite materials and which can be used in a wider variety of usable ranges.

Hence, the present inventors have studied earnestly to achieve the object, and have repeated trial and error over and over again. As a result, the present inventors found out that, when a filler was dispersed in a phenolic resin and when an organized layered clay mineral, which was different from the filler, was uniformly dispersed in the phenolic resin with the filler dispersed therein, it was possible to further improve the heat resistance of the resulting phenolic resin composite material. Thus, the present inventors have completed a phenolic resin composite material according to the present invention.

Namely, a phenolic resin composite material according to the present invention comprises: a phenolic resin; a filler dispersed in the phenolic resin and being a reinforcement member; and an organized layered clay mineral being different from the filler and dispersed uniformly in the phenolic resin.

Layered clay minerals usually have a layered structure in which a plurality of sheets are laminated. However, in the case of the organized layered clay mineral set forth in the present invention, the respective layers are disassembled so that each of the respective layers are turned into a sheet-shaped member or a sheet-shaped member in which an extremely small number of the layers are laminated. Thus, the respective layers are dispersed uniformly in the phenolic resin, and each one of the layers is bonded strongly to the phenolic resin by ion bond, by hydrogen bond or by both of them. Consequently, it is believed that, in the present phenolic resin composite material, a cross-linked structure is formed between the phenolic resin and organized layered clay mineral.

In other words, it is believed as follows. In the organized layered clay mineral, the respective layers overcome the bonding forces (e.g., the van der Waals force, the electrostatic attraction force, and the like), which are exerted between them, so that they are completely separated for each of the layers and exist independently. As a result, the phenolic resin and the organized layered clay mineral are strongly bonded by ion bonds, which are formed between negative charges possessed by the layers of the organized layered clay mineral and positive charges possessed by the end groups or side chains of the phenolic resin, by hydrogen bonds, which are formed between polar groups of the layers of the organized layered clay mineral and polar groups of the phenolic resin, or by both of them.

Thus, in the case of the present phenolic resin composite material, the dispersion of the organized layered clay mineral takes place in the phenolic resin in which the filler being the reinforcement member is dispersed. Therefore, since the phenolic resin, the organized layered clay mineral and the filler thus produce a synergetic effect, it is believed possible to obtain the present phenolic resin composite material, having good mechanical strengths, especially good heat resistance, which have not been available so far in conventional phenolic resin composite materials.

In accordance with the present invention, it is possible not only to further improve the heat resistance of phenolic resin composite materials but also to expand the applicable uses thereof.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
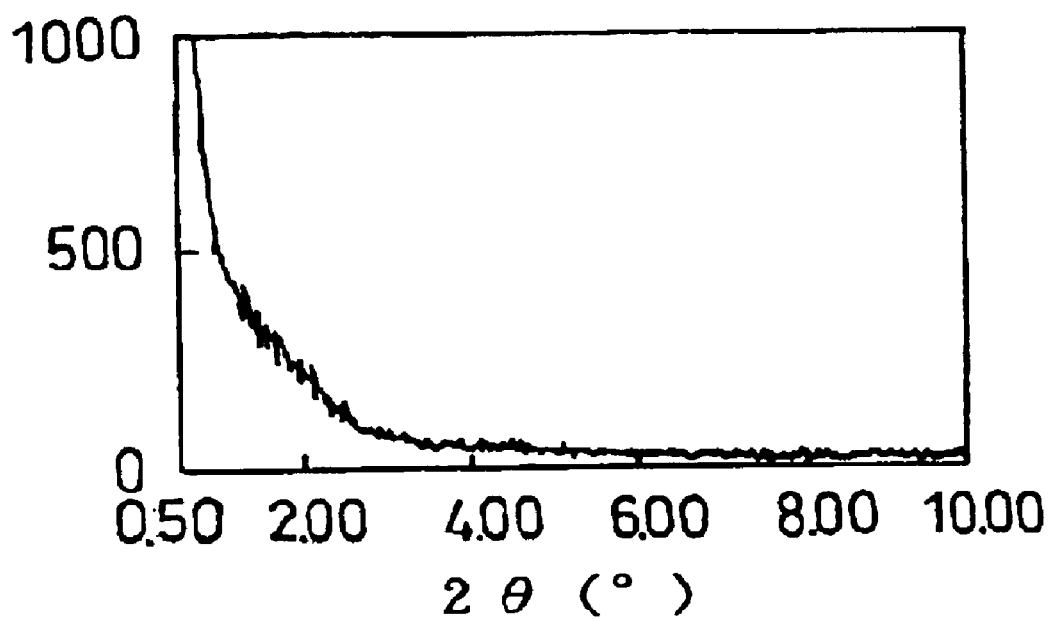
FIG. 1 is an x-ray diffraction chart on an example according to the present invention.

Having generally described the present invention, a further understanding can be obtained by reference to the specific preferred embodiments which are provided herein for the purpose of illustration only and not intended to limit the scope of the appended claims.

Hereinafter, the present invention will be described in more detail while referring to preferred embodiments.

(1) Organized Layered Clay Mineral

① The organized layered clay mineral refers to a layered clay mineral which is organized by an organic onium ion.

For example, as the organized layered clay mineral, there is a sodio-montmorillonite, and the like, which is organized by an organic onium ion. Since the sodio-montmorillonite exists widely in the natural environment and its cost is stable, it is preferable to use it as a raw material for the organized layered clay mineral.

② The layered clay mineral refers to a so-called layered phyllosilicate.

For instance, there are smectite-based clay minerals, such as montmorillonite, saponite, hectorite, beidellite, stevensite, nontronite, etc., vermiculite, halloysite, swelling micas, kaolinite, and so on.

Note that these layered clay minerals can be either natural or synthesized ones.

③ The organic onium ion can preferably have carbon atoms in a quantity of 6 or more. For example, an alkyl onium ion is a representative one. When the organic onium ion has carbon atoms in a quantity of less than 6, the hydrophilic property of such an organic onium ion is heightened so that there might arise a fear in that the compatibility of the organized layered clay mineral decreases with respect to the phenolic resin.

A variety of the onium ions can be primary, secondary, tertiary or quaternary ammonium ions. For instance, it is possible to use hexyl ammonium ion, octyl ammonium ion, 2-ethylhexyl ammonium ion, dodecyl ammonium ion, lauryl ammonium ion, octadecyl ammonium ion, dioctyl dimethyl ammonium ion, trioctyl ammonium ion, dioctadecyl dimethyl ammonium ion, trioctyl ammonium ion, dioctadecyl dimethyl ammonium ion, trioctadecyl ammonium ion, and the like.

Moreover, as the organic onium ion, it is possible to use phosphonium ions. As the phosphonium ion, it is possible to use tetraethyl phosphonium ion, triethyl benzyl phosphonium ion, tetra-n-butyl phosphonium ion, tri-n-butyl hexadecyl phosphonium ion, tri-n-butyl benzyl phosphonium ion, and so on.

④ The layered clay mineral can preferably be swelled greatly between the layers so that the respective layers are separated to uniformly disperse in the phenolic resin. In order to achieve the arrangement, it is preferable to control a cation exchange capacity of the layered clay mineral so as to fall in a range of from 50 to 200 milli-equivalent/100 g, further preferably from 70 to 150 milli-equivalent/100 g.

When the cation exchange capacity is less than 50 milli-equivalent/100 g, it is likely to insufficiently organize the layered clay mineral by means of ion exchange with the organic onium ion. Accordingly, as a result, there might arise a possibility in that it is difficult to swell the layered clay mineral.

On the other hand, when the cation exchange capacity exceeds 200 milli-equivalent/100 g, the number of bonds increases between the negative charges, which are possessed by the clay layers, and the cations, which are disposed between the clay layers. Consequently, the bonding forces are strengthened between the layers of the layered clay mineral so that it is difficult for the organic onium ion to intervene between the layers by means of ion exchange. Accordingly, as a result, there might arise a possibility in that the layered clay mineral is insufficiently swelled.

(2) Phenolic Resin

As for the phenolic resin, it is possible to exemplify resol type phenolic resins and novolak type phenolic resins. It is possible to use either one of them independently or to mix both of them to use.

In a case where the present phenolic resin composite material is used after it is cured, it is preferable to use a resol type phenolic resin. Namely, when a resol type phenolic resin is used, it is not necessary to separately prepare a curing agent, etc., and it is possible to avoid the adverse influence, which results from a curing agent, to the dispersion property of the layered clay mineral. Accordingly, a resol type phenolic resin is a preferable option.

In a case where the present phenolic resin composite material is used without curing, it is preferable to use a novolak type phenolic resin. Namely, when a novolak type phenolic resin is used, the self-condensation reaction hardly arises, and accordingly it is possible to avoid useless side reactions. Accordingly, a novolak type phenolic resin is a preferable option, when the present phenolic resin composite material is mixed with another resins, which will be described later.

(3) Filler

As far as the filler is a reinforcement member which is filled in phenolic resins, the species can be either organic materials or inorganic materials. Therefore, the filler can be, for instance, glass fibers, calcium carbonate, wooden powders, cotton, or organic fibers, such as polyester fibers, polyamide fibers, polyvinyl alcohol fibers, aromatic polyamide fibers, carbon fibers, etc., or organic or inorganic fillers, which are usually used. These fillers can be used independently or can be mixed to use. However, it is further preferable to use glass fibers, calcium carbonate or wooden powders. Since they are less expensive than organic fibers, and so on, they can be included in a large amount and can thereby enhance the heat resistance of the present phenolic resin composite material. They are more preferable options. Among them, it is most preferable to use glass fibers. This is because glass fibers produce a higher reinforcement effect with a smaller amount than calcium carbonate and wooden powders do.

Incidentally, note that the filler and organized layered clay mineral can preferably be included in a summed amount of 75% by mass or less when the entire present phenolic resin composite material is taken as 100% by mass.

When the summed amount exceeds 75% by mass, the content of the phenolic resin is less than 25% by mass. Then, it is difficult to manufacture a phenolic resin composite material which can stably sustain the heat resistance. A summed amount of the filler can further preferably fall in a range of from 30 to 65% by mass. Moreover, a content of the organized layered clay mineral can preferably fall in a range of from 2 to 65% by mass, further preferably in a range of from 2 to 10% by mass. Specifically, the present phenolic resin composite material can furthermore preferably comprise the phenolic resin being a mother matrix, the filler in an amount of from 30 to 65% by mass and the organized layered clay mineral in an amount of from 2 to 10% by weight, when the entire present phenolic resin composite material is taken as 100% by mass.

(4) Uses

The present phenolic resin composite material can be used for a variety of products in a diversity of fields, such as automotive component parts, aircraft component parts, component parts for electric and electronic instruments, materials for architecture, and so on. For instance, such a product can be a heat-resistant resinous member which is formed from a phenolic resin composite material comprising a phenolic resin; a filler dispersed in the phenolic resin and being a reinforcement member; and an organized layered clay mineral being different from the filler and dispersed uniformly in the phenolic resin. In particular, by making use of the good heat resistance, it is preferable to use the present phenolic resin composite material for component members, taking automotive component parts for example, covers or stays in engine rooms, pulleys for tensioners, pulleys for power steering systems, pulleys for compressors, or the like. When the present phenolic resin composite material is applied to such uses, depending on the uses, it is possible to add reforming materials. As the reforming materials, it is possible to exemplify elastomers and rubbers. It is possible to add such reforming materials in an amount of from 0.05 to 70 parts by weight with respect to 100 parts by weight of the present phenolic resin composite material which is made of the phenolic resin, the filler and the organized layered clay mineral.

Moreover, when the present phenolic resin composite material is applied to the aforementioned uses, it is possible to mix it with thermoplastic resins to use it as a reforming material for them. As the thermoplastic resins, it is possible to exemplify polyamide resins, polyolefin resins, polyester resins, polyphenylene oxide resins, and so on. When the present phenolic resin composite material is used as a reforming material for these thermoplastic resins, it can be added in an amount of from 0.05 to 50 parts by weight with respect to 100 parts by weight of the thermoplastic resins. Note that, when the present phenolic resin composite is used as a reforming material for thermoplastic resins, the above-described novolak type phenolic resin is a preferable option for the phenolic resin component.

EXAMPLES

Hereinafter, the present invention will be described in much more detail while referring to specific examples.

(1) Manufacturing Samples and Test Pieces

① Manufacturing Organized Clay (Organized Layered Clay Mineral)

A sodio-montmorillonite was used as the layered clay mineral, and octadecyl ammonium was used as the organic onium salt, respectively. Note that the sodio-montmorillonite was produced by KUNIMINE KOGYO Co., Ltd. They were stirred and mixed in water so that the sodio-montmorillonite (i.e., the layered clay mineral) was ion-exchanged with the octadecyl ammonium ion (i.e., the organic onium ion) so that a cation exchange capacity was 110 milli-equivalent/100 g. Thus, an organized clay was manufactured.

② Preparation of Formed Materials

A resol type phenolic resin with an additive agent added was used, and was compounded with a variety of fillers, set forth in Table 1 below, as well as the above-described organized clay in contents, set forth in Table 1, and was kneaded with them by means of thermal roll (kneader). Note that the resol type phenolic resin was produced by SUMITOMO BAKELITE Co., Ltd. Thus, formed materials, designated at Sample Nos. 1 through 8 in Table 1, were prepared. Note that the contents, set forth in Table 1, are expressed by % by mass.

TABLE 1

| Sample No. | 1 | 2 | 3 | 4 | 5 | 6 | 7 | 8 |
|---|---|---|---|---|---|---|---|---|
| | Glass Fiber | | | Calcium Carbonate Powder | | | Wooden Powder | |
| Filler | 50% | 45% | 40% | 50% | 45% | 40% | 50% | 45% |
| Organized Clay | 0% | 5% | 10% | 0% | 5% | 10% | 0% | 5% |
| Matrix Resin (Resol Phenolic Resin) | 45% | 45% | 45% | 45% | 45% | 45% | 45% | 45% |
| Additive | 5% | 5% | 5% | 5% | 5% | 5% | 5% | 5% |

③ Forming of Test Pieces

By using the formed materials of above-described Sample Nos. 1 through 8, test pieces for a bending test were formed with a compression molding machine, respectively. The compression molding machine could exert a mold clamping force of 35 ton (i.e., 343 kN). The forming was carried out under such conditions that a mold temperature was 175° C., a curing time was 3 minutes and a forming pressure was 15 MPa. The test pieces were prepared in accordance with the definition set forth in JIS (Japanese Industrial Standard) K6911, and had a thickness of 4 mm and a width of 10 mm and a length of 80 mm.

(2) Observation on Dispersing State of Organized Clay

Figure 2:
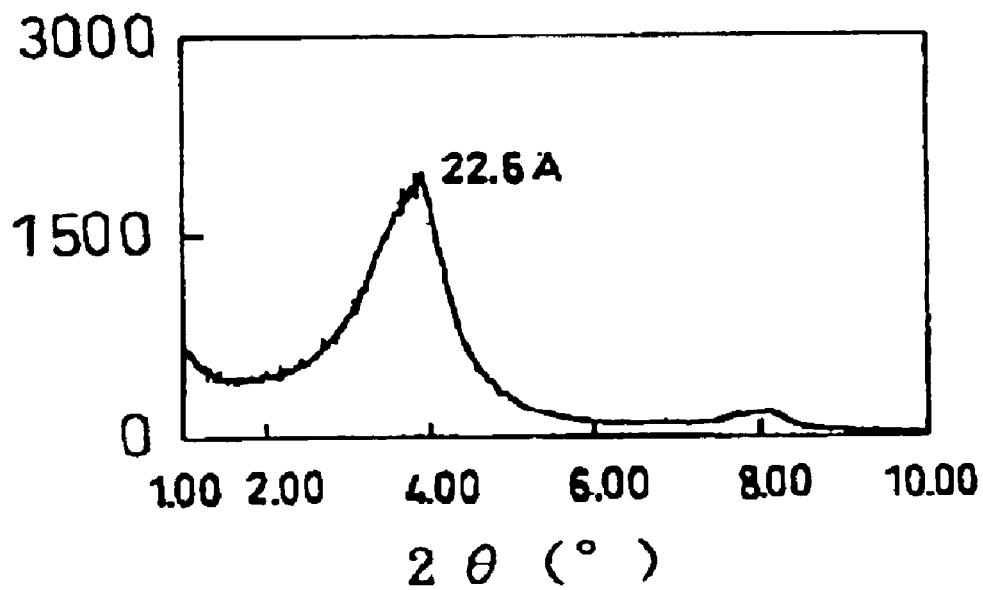
FIG. 2 is an x-ray diffraction chart on a clay itself which was used in manufacturing an example according to the present invention.

In order to observe the dispersing state of the organized clay, a tiny specimen was cut out of the formed material of Sample No. 8, and was subjected to an x-ray diffraction measurement under the conditions summarized in Table 2 below. The result obtained in this instance is illustrated in FIG. 1. Moreover, under the same conditions, the clay itself before the organizing treatment was subjected to an x-ray diffraction measurement. The result obtained in this instance is illustrated in FIG. 2 for reference. Note that the horizontal axis of FIGS. 1 and 2 designates diffraction angles (°) and the vertical axis thereof designates intensities of x-ray.

TABLE 2

| X-ray Source | Cu-Kα |
| --- | --- |
| Tube Voltage and Tube Current | 30 kV and 30 mA |
| Slit | D.S.: 0.17, R.S.: 0.15 and S.S.: 0.17 |
| Apparatus | "RAD-B" Made by RIGAKU DENKI Co., Ltd. |

It is understood from FIG. 2 that, in the case of the clay itself, a peak, which resulted from the layered structure was clearly observed in the x-ray diffraction chart. However, it is understood from FIG. 1 that, in the case of the formed material of Sample No. 8 according to an example of the present invention, no peak was appreciated in the x-ray diffraction chart. Thus, it is believed that, in the phenolic resin composite material according to an example of the present invention, the respective layers of the organized clay were separated at the interfaces, the organized clay had not already taken a layered structure, and consequently the respective layers were dispersed uniformly in the phenolic resin composite material.

(3) Evaluation on Heat Resistance

① Weight Reduction Temperature

A weight reduction temperature, one of the indexes of heat resistance, was measured. Specifically, tiny specimens were cut out of the formed materials of the respective samples, and were measured for weight reductions by using a thermobalance "TG/DTA220," which was produced by SEIKO ELECTRIC Co., Ltd. Note that the measurement was carried out in an air flow at a temperature increment rate of 10° C./min.

In Table 3 below, there are set forth 5% and 10% weight reduction temperatures, which were exhibited by the specimens cut out of the formed materials of the respective samples.

When the filler was the glass fiber (Sample Nos. 1 through 3) and when the filler was the calcium carbonate powder (Sample Nos. 4 through 6), it is understood that the 5% weight reduction temperatures and 10% weight reduction temperatures increased apparently, and that the heat resistance of the specimens was improved by adding the organized clay.

In any case, when the filler was the wooden powder (Sample Nos. 7 and 8), it was not observed that the weigh reduction temperature was increased. However, this phenomenon is believed to have resulted from the decomposition of the wooden powder, which was an organic component, at a low temperature. Moreover, it is understood from a later-described bending strength retention ratio that this phenomenon does not deny the improvement of the heat resistance in the present phenolic resin composite material in which a wooden powder is included as the filler.

② Long Term Degradation

Figure 3:
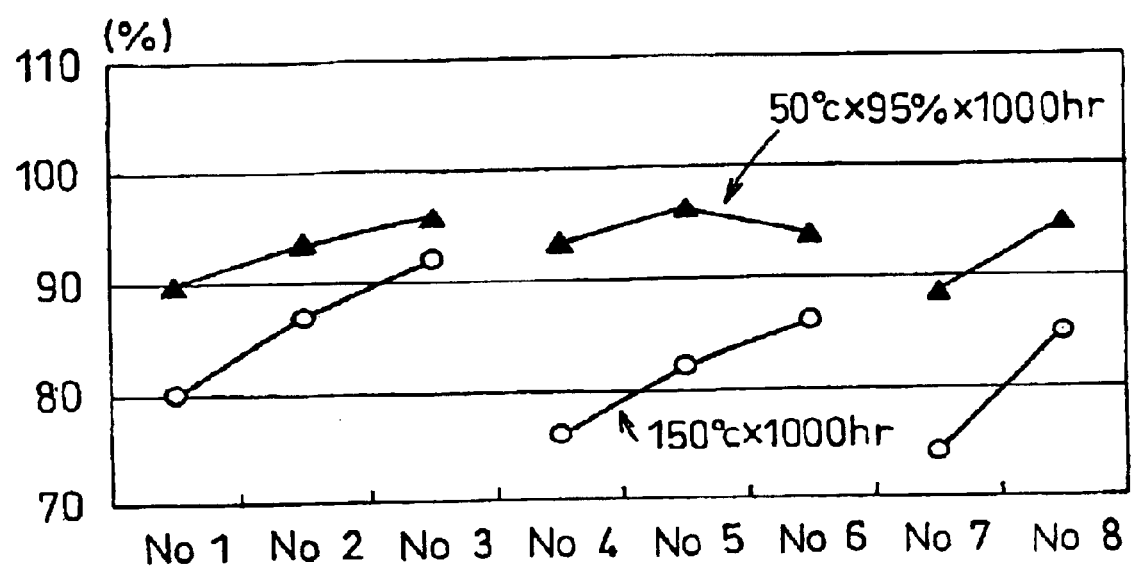
FIG. 3 is a graph for illustrating bending strength retention ratios which were exhibited by a variety of phenolic resin composite materials when they were subjected to a long term degradation test.

The examples of the phenolic resin composite material according to the present invention were examined for the high temperature durability and the high moisture durability, the other indexes of the heat resistance. Specifically, the test pieces for the bending test according to JIS, which were formed of Sample Nos. 2 through 8, were measured for the bending strengths before and after they were left in air at 150° C. for 1,000 hours as well as the bending strengths before and after they were left in air of 95% moisture at 50° C. for 1,000 hours. The retention ratios of the bending strengths were determined from the measurement values before and after they were left in the environments. The results are illustrated in FIG. 3. Note that the measurement was carried out by using an autograph, which was produced by SHIMAZU SEISAKUSHO Co., Ltd.

It is understood from the results that, regardless of whether the filler was made from an organic material or an inorganic material, the retention ratios of the bending strengths of the phenolic resin composite materials were improved no matter which fillers were used. In particular, the test pieces, which were made from the formed materials (Sample Nos. 3 and 6) with the organized clay added in an amount of 10% by mass, were greatly improved in terms of the retention ratios of the bending strengths.

At present, it has not necessarily been clarified yet why the heat resistance of the examples according to the phenolic resin composite material of the present invention is improved. As a mechanism of producing the advantage, it is believed, however, that the respective layers of the organized clay are dispersed so uniformly that the phenolic resin is inhibited from being oxidized to degrade.

Having now fully described the present invention, it will be apparent to one of ordinary skill in the art that many changes and modifications can be made thereto without departing from the spirit or scope of the present invention as set forth herein including the appended claims.

What is claimed is:

1. A phenolic resin composite material, comprising:
   a phenolic resin;
   a filler dispersed in the phenolic resin and being a reinforcement member; and
   an organized layered clay mineral comprising a layered clay mineral which is organized by an organic onium ion, said organized layered clay mineral being different from the filler and dispersed uniformly in the phenolic resin;
   wherein said filler and said organized layer clay mineral are included in a summed amount of 75% by mass or less when the entirety is taken as 100% by mass.

2. The phenolic resin composite material according to claim 1, wherein said phenolic resin is a resol phenolic resin.

3. The phenolic resin composite material according to claim 1, wherein said filler is at least one member selected from the group consisting of glass fibers, calcium carbonate and wooden powders.

TABLE 3

| Sample No. | 1 | 2 | 3 | 4 | 5 | 6 | 7 | 8 |
| --- | --- | --- | --- | --- | --- | --- | --- | --- |
| 5% Weight Reduction Temp. (° C.) | 333.5 | 346.2 | 342.9 | 341.5 | 348.8 | 352.2 | 239.6 | 238.3 |
| 10% Weight Reduction Temp. (° C.) | 372.1 | 419.2 | 424.4 | 381.2 | 425.4 | 422.0 | 297.1 | 296.0 |

4. The phenolic resin composite material according to claim 1, wherein said layered clay mineral is sodium-montmorillonite and said organic onium ion is octadecyl ammonium ion.

5. The phenolic resin composite material according to claim 1, wherein said filler is included in an amount of from 30 to 65% by mass when the entirety is taken as 100% by mass.

6. The phenolic resin composite material according to claim 1, wherein said organized layered clay mineral is included in an amount of from 2 to 65% by mass when the entirety is taken as 100% by mass.

7. A phenolic resin composite material, comprising:
   a phenolic resin being a mother matrix;
   a filler, dispersed in the phenolic resin and being a reinforcement member, in an amount of from 30 to 65% by mass; and
   an organized layered clay mineral comprising a layered clay mineral which is organized by an organic onium ion, said organized layered clay mineral being different from the filler and dispersed uniformly in the phenolic resin, in an amount of from 2 to 10% by mass, when the entirety is taken as 100% by mass.

8. A heat-resistant resinous member being formed from a phenolic resin composite material comprising: a phenolic resin; a filler dispersed in the phenolic resin and being a reinforcement member; and an organized layered clay mineral comprising a layered clay mineral which is organized by an organic onium ion, said organized layered clay mineral being different from the filler and dispersed uniformly in the phenolic resin.

* * * * *